United States Patent [19]

Macaulay

[11] Patent Number: 5,013,978
[45] Date of Patent: May 7, 1991

[54] COMPENSATION ARRANGEMENT FOR DISPLAY SYSTEMS

[75] Inventor: Malcolm Macaulay, Fullerton, Calif.

[73] Assignee: Hughes Aircraft Company, Los Angeles, Calif.

[21] Appl. No.: 403,965

[22] Filed: Sep. 6, 1989

[51] Int. Cl.$^5$ .................... G09G 1/04; H01J 29/70; H01J 29/51

[52] U.S. Cl. .................... 315/367; 315/368; 315/371

[58] Field of Search ............... 315/370, 371, 367, 368

[56] References Cited

U.S. PATENT DOCUMENTS

| 4,598,234 | 7/1986 | McKibben | 315/370 |
| 4,687,973 | 8/1987 | Holmes et al. | 315/371 |
| 4,799,000 | 1/1989 | Close | 315/371 |

Primary Examiner—Gregory C. Issing
Attorney, Agent, or Firm—Wanda K. Denson-Low

[57] ABSTRACT

A compensation arrangement for a display system that adaptively compensates the display parameters thereof for each pixel position to provide a precise display image that automatically adapts to the scan rate and aspect ratio of its sweep circuit. The sweep signals are sensed directly to define the actual instantaneous scan position. The sweep position is used to generate a compensation parameter for compensating the display signals. In a preferred embodiment, a lookup table is used to store compensation parameters, a compensation parameter is accessed from the table in response to the sweep signals, and the accessed compensation parameter is used to compensate the display signals.

4 Claims, 2 Drawing Sheets

COMPENSATION ARRANGEMENT FOR DISPLAY SYSTEMS

BACKGROUND

The present invention relates generally to display systems, and more particularly to aberration correction for cathode ray tube (CRT) images.

Geometric distortion, defocusing, astigmatism and brightness disparity are commonly found on images formed on CRT displays. In many cases, such aberrations are tolerated by the viewer in small amounts. In the case of high resolution graphic and projection displays, however, such aberrations detract noticeably from the quality of the image and its usefulness to the viewer. Aberrations are especially noticeable in the case of quasi-static displays, such as those encountered in connection with military charts and maps in command and control applications.

Methods to correct aberrations provide dynamic modulation of the appropriate CRT electrodes or deflection means by correction signals generated from a prestored set of digital values, and by correction signals derived by analog methods based on CRT deflection signals. Both of these methods have limitations that make them less than fully effective. The digital method has the advantage of being able to cope with nonlinear characteristics, but fails to connect correction data and CRT image position with certainty, especially when various line rates and aspect ratios must be accepted by the display equipment. The analog method fails to cope with the nonlinear characteristics common to production model CRTs.

Compensation devices for display monitors and particularly for CRTs are well known in the art. In the case of conventional analog compensation circuits, electrical signals representative of CRT deflection signals are provided to analog signal processing circuits to generate related correction signal waveforms. The operator adjusts potentials and components of the analog circuits to achieve a suitable correction. The analog correction method is commonly used for focus and astigmatism correction. However, such analog techniques cannot accommodate pixel by pixel compensation as is required in many types of modern CRT based systems.

Conventional compensation devices, such as brightness compensation devices, are often implemented with operator controls and some, such as convergence compensation devices may be implemented with internal maintenance controls. However, no conventional compensation device has been built that automatically compensates for scan rate and aspect ratio changes without modifying the equipment.

Accordingly, it would be desirable to have a circuit for a CRT monitor that adaptively corrects for convergence, focus, linearity, distortion, astigmatism, brightness variations and which adapts to changes in aspect ratio and scanning rate. It would also be advantageous to have a system that provides a link between correction data address and image element position that is independent of image aspect ratios and scanning rates to facilitate instantaneous automatic correction for display equipment operating in an environment of differing scanning standards and aspect ratios.

SUMMARY OF THE INVENTION

Accordingly, the present invention provides a link between correction data address and image element position that is independent of image aspect ratios and scanning rates. This therefore provides for instantaneous automatic correction of display equipment operating in an environment of differing scanning standards and aspect ratios. The invention provides for apparatus that overcomes deficiencies in CRT display linearity, geometric distortion, defocusing, astigmatism and brightness uniformity by using the analog deflection signals of the CRT to address a digital correction data storage memory to retrieve signals that overcome nonlinear and linear aberrations. The present invention thus provides a compensation arrangement that adaptively compensates for the aberrations associated with the display system.

In one embodiment, sweep signals are sensed directly to define the actual instantaneous scan position. The sweep position is used to generate a compensation parameter for compensation of the display signals. Alternatively, a lookup table is used to store compensation parameters, a compensation parameter is accessed from the table in response to the sweep signals, and the accessed compensation parameter is used to compensate the display monitor. Because the scan signals control the position of the electron beam on the display media, locking of the compensation parameters to the scan signals in accordance with the present invention also locks the compensation parameters to the position of the electron beam on the display media. With the compensation parameters locked to fixed positions on the display media, improved stability and improved flexibility are obtained.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
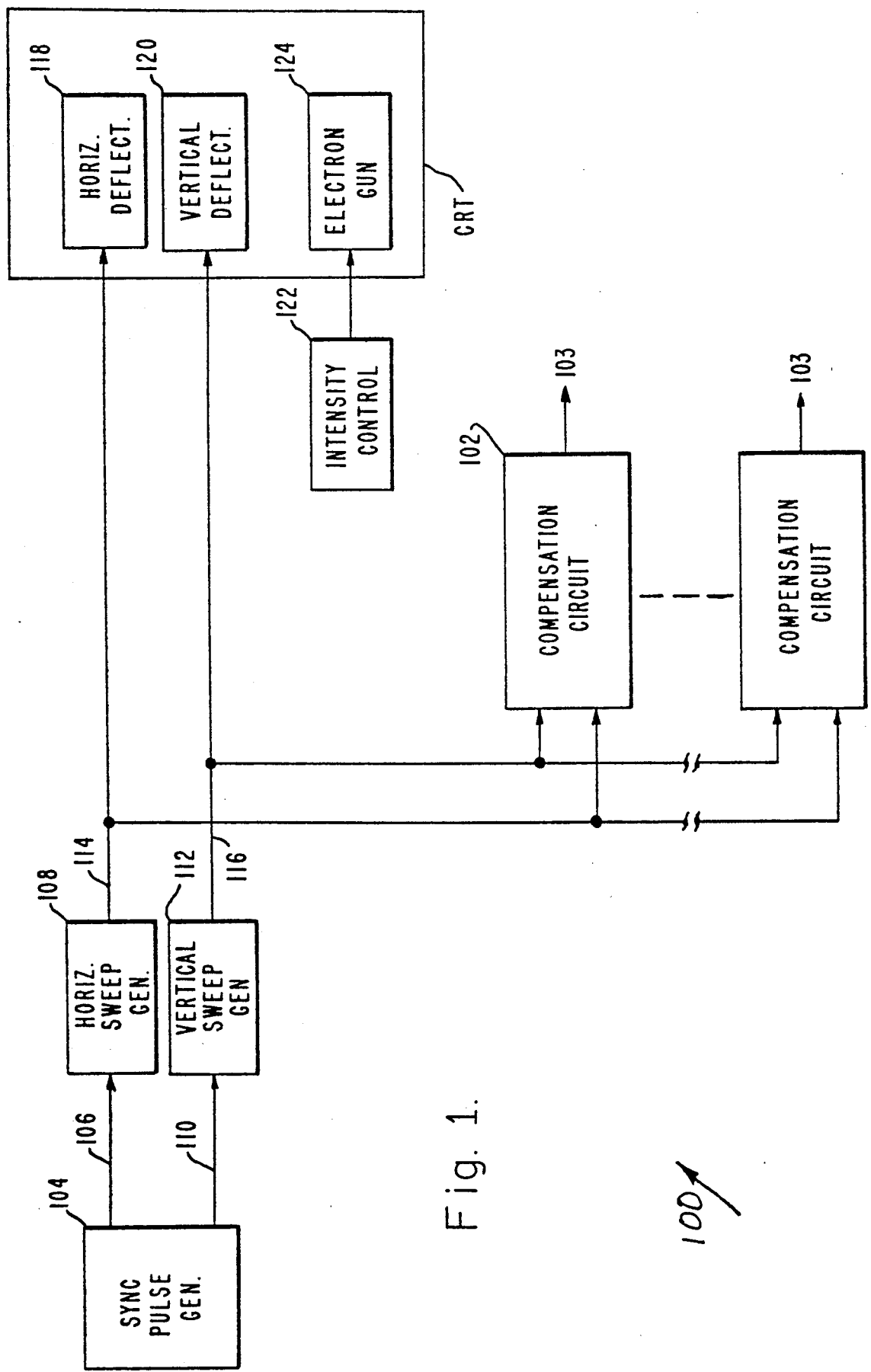
FIG. 1 is a block diagram representation of a display system in accordance with the principles of the present invention.

FIG. 1 is a block diagram of a display system 100 having compensation circuits 102 in accordance with the principles of the present invention. The CRT display system 100 is shown implemented with a sync pulse generator 104 that generates a horizontal sync pulse signal 106 to synchronize a horizontal sweep generator 108, and a vertical sync pulse signal 110 to synchronize a vertical sweep generator 112. The horizontal sweep generator 108 generates a horizontal sweep signal 114 in the form of a ramp having a horizontal frequency, 15,750 Hz for a conventional raster scanned display configuration, in synchronism with the horizontal sync pulse 106. The vertical sweep generator 112 generates a vertical sweep signal 116 in the form of a ramp having a vertical frequency, 60 Hz for a conventional raster scanned display configuration, in synchronism with the vertical sync pulse 110. The horizontal sweep signal 114 is applied to the horizontal deflection circuitry 118 of a CRT which may have a set of plates in an electrostatic deflection configuration and horizontal deflection coils in a magnetic deflection configuration. The vertical sweep signal 116 is applied to the vertical deflection circuitry 120 of the CRT in an electrostatic deflection configuration and to vertical deflection coils in a magnetic deflection configuration. An electron gun 124 is arranged to generate an electron beam under control of an intensity control circuit 122.

A compensation circuit 102 in accordance with the principles of the present invention is preferably connected to process the horizontal and vertical sweep signals 114, 116 to control a compensation signal 103 in response thereto. The sweep signals 114, 116 cause the electron beam of the CRT to be swept across the screen. The horizontal sweep signal 114 more rapidly sweeps the electron beam in the horizontal direction and the vertical sweep signal 116 more slowly sweeps the electron beam in the vertical direction. Hence, the horizontal sweep signal 114 may be considered to be the least significant part of the screen position and the vertical sweep signal 116 may be considered to be the most significant part of the screen position. The combination of the value of the horizontal sweep signal 114 and the value of the vertical sweep signal 116 defines the two dimensional (horizontal and vertical) position on the screen to which the electron beam is deflected. Hence, generation of the compensation signals 103 under control of the horizontal sweep signal 114 and vertical sweep signal 116 causes the compensation signals 103 to be generated in relation to the actual position on the screen. The compensation signals 103 can be applied to the horizontal and vertical sweep generators 108, 112 to compensate the sweep, can be applied to the intensity control 122 to compensate the brightness, and can be applied to other compensation circuits or devices to compensate for other display parameters as mentioned above.

Figure 2:
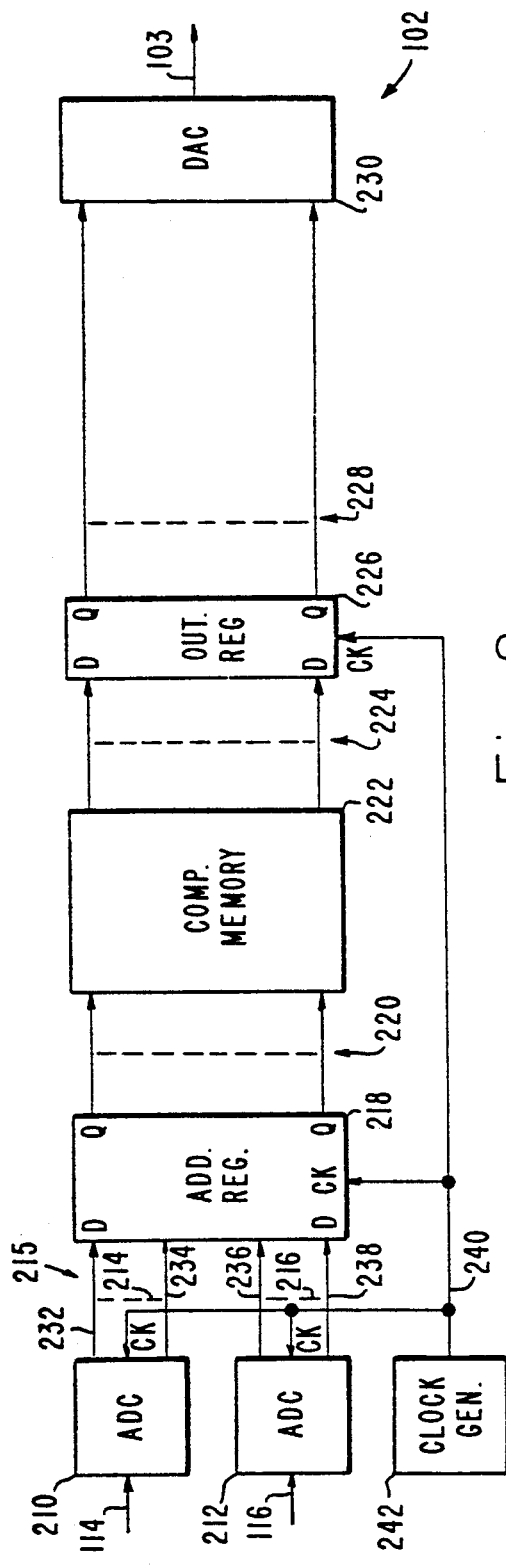
FIG. 2 is a detailed diagram of a compensation circuit of FIG. 1.

FIG. 2 is a detailed diagram of one compensation circuit 102 in accordance with the present invention. A pair of analog to digital converters (ADCs) are implemented to convert the analog sweep signals 114, 116 to digital numbers. A horizontal ADC 210 is connected to convert the horizontal sweep signal 114 to a digital number 214 and a vertical ADC 212 is connected to convert a vertical sweep signal 116 to a digital number 216. ADCs can be implemented with various types of ADCs, such as successive approximation ADCs, tracking ADCs, and flash or propagation ADCs. In a high performance configuration, the ADCs 210 and 212 are preferably implemented with flash ADCs because of the greater performance of flash ADCs.

The digital numbers 214, 216 can be combined, such as by concatenation, to form a single address parameter 215 for addressing a compensation memory 222. One address register configuration combines the horizontal sweep signal 214, having a least significant bit (LSB) 232 and a most significant bit (MSB) 234, as the least significant part of the address signal and with the vertical sweep signal 216, having a LSB 236 and a MSB 238, as the most significant part of the address signal. In an address register configuration, the address register 218 is inserted between the ADCs 210, 212 and the compensation memory 222 to latch the address parameter 215 as a latched address parameter 220. In a non-address register configuration, the address register 218 can be removed from between the ADCs 210, 212 and the compensation memory 222 so that the address parameter 215 is not latched. The address parameter 220 can be implemented to access the memory 222 in a conventional manner to generate the output compensation parameter 224 in response to the memory address parameter 220.

The compensation memory 222 can be implemented to store compensation parameters. The size of the memory 222 can be adapted by those skilled in the art to have the required number of parameters per memory and the required number of bits per parameter. For example, memory chips can be expanded in the bit direction to implement the required number of bits per compensation parameter and memory chips can be expanded in the word direction to implement the required number of words or parameters per memory. The compensation memory 222 can be implemented with various types of memory circuits, such as electrically alterable and volatile SRAMs or DRAMs, electrically alterable and nonvolatile PROMs, EPROMs, or EEPROMs; non-electrically alterable and nonvolatile ROMs, or other memory types.

In an output register configuration, an output register 226 is inserted between the compensation memory 222 and a digital to analog converter (DAC) 230 to latch compensation parameter 224 as latched compensation parameter 228. In a non-output register configuration, output register 226 can be removed from between the compensation memory 222 and the DAC 230 so that the output parameter 228 is not latched. The compensation parameter 228 can be implemented to excite the DAC 230 in a conventional manner to generate the analog compensation signal 103 in response to digital compensation parameter 228. The analog compensation signal 103 can be used to control a compensation device or circuit in the display monitor.

A clock signal can be provided to synchronize operations. In a pixel clock configuration, a clock signal generator 242 can be implemented to generate a clock signal 240 using a phase locked loop, which is well known in the art, to phase lock the clock signal 240 to the scan signal. For example, the clock signal 240 can be phase locked to the pixel steps of the LSB 232 of the sweep signals 215. This clock signal 240 can be a single phase clock signal or a multiple phase clock signal and can be counted down and decoded to generate various control signals. However, for simplicity of discussion, the clock signal 240 is discussed as a single phase clock signal generating a single clock pulse for each change in the LSB 232 of the memory address 215. The clock signal 240 is shown clocking the compensation parameter 224 previously accessed from the compensation memory 222 into the output register 226, simultaneously clocking a new address 215 into the address register 218 to access the next compensation parameter 224 from the compensation memory 222, and simultaneously clocking the ADCs 210, 212 to initiate another conversion. Alternatively, the ADCs 210, 212 may be implemented to operate asynchronously and hence may not need an external clock signal. Other devices can be clocked as required. For example, for a configuration where DRAMs are used to implement the compensation memory 222, a DRAM controller circuit can be used to generate RAS, CAS, refresh, and other signals used for DRAM operations. DRAM controllers for generating such signals are well known in the art.

ADC resolution can be related to display monitor resolution. In a configuration having a direct mapping of each compensation parameter stored in the compensation memory 222 into each pixel in the frame, the number of bits in the address words 215, 220 and the number of compensation parameters stored in the compensation memory 222 is a relatively large number. For example, a low resolution display monitor may have 65,536 pixels, 256 pixels per line by 256 lines per frame, relating to two 8-bit ADCs. Alternately, a medium resolution display monitor may have 262,144 pixels, 512 pixels per line by 512 lines per frame, relating to two 9-bit ADCs. Alternately, a high resolution display monitor may have 1,048,576 pixels, 1024 pixels per line by 1024 lines per frame, relating to two 10-bit ADCs.

Figure 3:
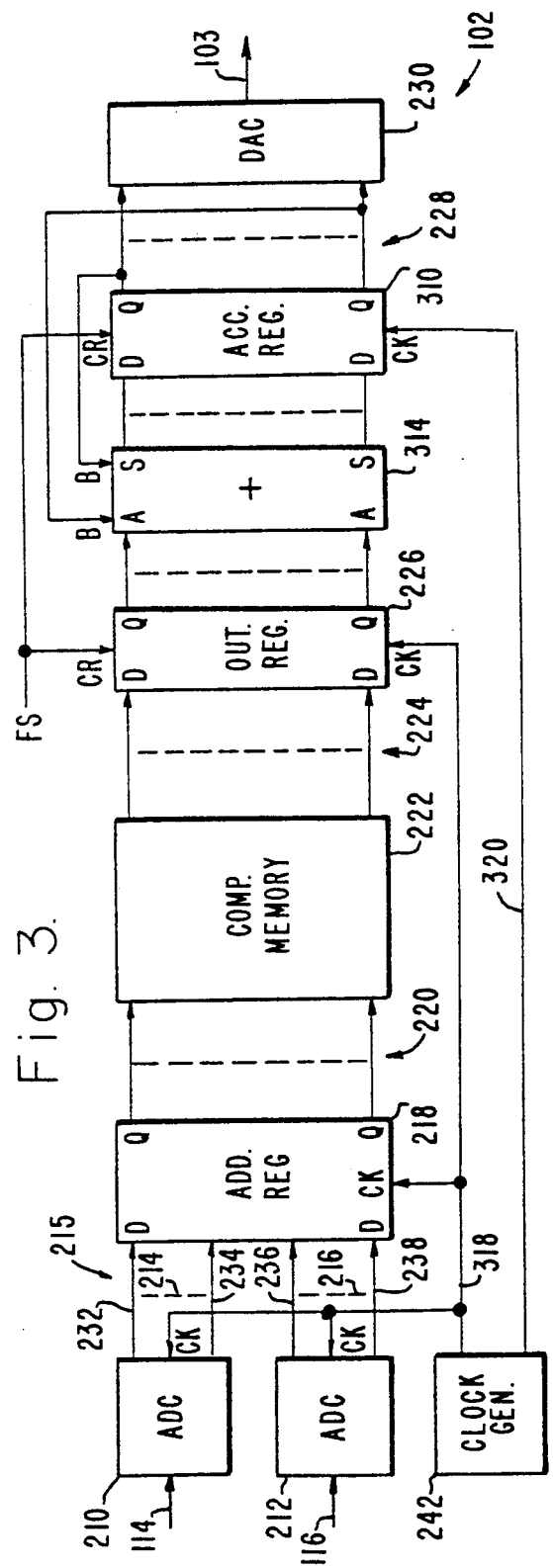
FIG. 3 is a detailed diagram of an interpolation implementation of the compensation circuit of FIG. 1.

The compensation arrangement discussed with reference to FIG. 2 can be reduced in cost and complexity and can be improved in utility by implementing compensation interpolation. FIG. 3 is an alternate detailed diagram of a compensation circuit 102 having compensation interpolation in accordance with the present invention. Conditions to be compensated conventionally vary in a relatively smoothly form across a CRT screen, such as across a scan line and between adjacent scan lines. Hence, in many applications it may be acceptable to store compensation parameters for a limited subset of spaced apart calibrated pixels and then to interpolate between the calibrated pixels in order to derive the compensation parameters for the in between uncalibrated pixels. For example, in a medium resolution (512 pixels per line by 512 lines per frame) monitor configuration, the compensation memory 222 may be implemented to store a compensation parameter for each 32nd pixel, involving a total of 256 compensation parameters (16 by 16 compensation parameters) per monitor. This can reduce the memory requirement and the related efforts required to generate the compensation parameters from 262,144 compensation parameters in the FIG. 2 type configuration to 256 compensation parameters in this FIG. 3 configuration, and this can reduce the ADC resolution requirement from 9-bits per ADC in the FIG. 2 type configuration to 4-bits in this FIG. 3 configuration. Similarly, in a high resolution (1024 pixels per line by 1024 lines per frame) monitor configuration, the compensation memory 222 may be implemented to store a compensation parameter for each 16th pixel, yielding a total of 4096 compensation parameters (64 by 64 compensation parameters) per monitor. This can reduce the memory requirement from 1,048,576 compensation parameters to 4096, and this can reduce the ADC resolution requirement from 10-bits per ADC to 6-bits.

Interpolated compensation parameters can be stored in various forms, such as in the form of compensation parameters for the spaced apart calibrated pixels, in the form of the change in the compensation parameters for the spaced apart calibrated pixels, or in other forms. The configuration where the interpolated compensation parameters are stored in the form of the change in the compensation parameter for each pixel will be discussed as illustrative of the other alternative configurations.

As discussed with reference to FIG. 2 above and as shown in FIG. 3, a pair of ADCs 210 and 212 can be implemented to convert the analog sweep signals to the digital numbers 214, 216, the digital numbers 214, 216 can be combined to form a single address parameter 215 for addressing the compensation memory 222, with or without the address register 218, the compensation memory can be used to generate the output compensation parameter 224 in response to the memory address 220, the compensation number 228 can be implemented to excite the DAC 230 to generate the analog compensation signal 103 in response to the digital compensation parameter 228, and the analog compensation signal 103 can be used to control a compensation device or circuit in a display monitor.

The compensation memory 222 can be implemented to store compensation parameter changes, instead of the absolute value of the parameters, for interpolation. Various configurations can be implemented, as discussed below. To facilitate examples of interpolation, a notation of C(P, R) will be used; where the "C" symbol is used to designate the array of compensation parameters, the "P" symbol is used to designate the number of the column of the compensation parameter, which is in the horizontal direction, and the "R" symbol is used to designate the number of the row of the compensation parameter, which is in the vertical direction. Hence, C(0, 0) represents the horizontal compensation parameter (X) and the vertical compensation parameter (Y) for the first pixel of the first row and C(32, 64) represents the compensation parameter for the 32nd pixel of the 64th row.

An interpolation configuration having interpolation that covers a group of 32 pixels along a line will now be discussed. Other configurations having 8, 16, 75, or other sized groups of pixels can also be implemented. Also, it will be assumed that compensation change parameters are in twos complement negative number notation so that positive and negative compensation parameters can be implemented to compensate for positive and negative deviations from a reference value. Also, it will be assumed that the reference value is the first pixel in the frame, which has an implied zero compensation value, and that the accumulator register 310 is cleared at the beginning of the frame. This reference compensation parameter may be considered to be the perfect intensity value in an intensity compensation circuit, or the perfect focus value in a focus compensation circuit, or zero distortion value in a distortion compensation circuit, or the perfect convergence value in a convergence compensation circuit, or zero astigmatism value in an astigmatism compensation circuit. Hence, the reference compensation parameter will be assumed to have a value of $0000_{10}$. In a configuration having 32 pixels per group, the first compensation parameter C(0, 0) will be used for interpolation of the first group of 32 pixels in the horizontal direction along the first line (line-0), the second compensation parameter C(32, 0) will be used for interpolation of the second group of 32 pixels in the horizontal direction along the first line (line-0), the seventeenth compensation parameter C(0, 32) will be used for interpolation of the first group of 32 pixels in the horizontal direction along the second line (line-1), and so forth.

The creating of the compensation change parameters and the processing of the compensation change parameters will now be discussed for this 32 pixel group configuration to illustrate interpolation operation. The first change compensation parameter can be derived by taking the difference between the reference value and the first compensation value and dividing by the number of pixels in the group. Hence, for each of the 32 pixels in the first group, the zero value of the reference position is successively incremented by the first compensation change parameter (1/32 of the first compensation change value) on a pixel by pixel until the full compensation value is accumulated for the last pixel position in the group. The second compensation change parameter stored in the compensation memory 222 is derived by taking the difference between the first compensation value calibrating the 32nd pixel and the second compensation value calibrating the 64th pixel and dividing this difference by the number of pixels in the group. Hence, for each of the second group of 32 pixels, the previously accumulated value of the first compensation parameter is successively incremented by the second compensation change parameter on a pixel by pixel basis until the full compensation value is accumulated at the 64th pixel. This operation proceeds from pixel group to pixel group in each line and then retraces to the start of the next line for the next pixel group until the full field has been displayed.

By way of example, interpolation will now be discussed with reference to FIG. 3 for the interpolation configuration discussed above. At the start of the frame, the interpolation registers 310 and 226 are cleared by the frame sync pulse FS* to the clear input terminals CR. Then, at the start of the processing of each group of pixels, the next successive compensation change parameter is accessed from the compensation memory 222 and loaded into the output register 226. Then, for the duration of the processing of each group of pixels, the compensation change parameter stored in the accumulator register 310 by the adder 314. Hence, the compensation parameter stored in the accumulator register 314 is updated on a pixel by pixel basis within each pixel group and is updated on a pixel group by pixel group basis until the frame is completed.

Clock signals can be provided to synchronize operations, such as discussed above for the clock signal 240. In an interpolation configuration, the clock signal 318 provided to the compensation circuitry 210, 212, 218, and 226 may be implemented to be at the compensation clock rate, which may be slower than the pixel clock rate, and the clock signal 320 provided to the interpolation circuitry 310 may be implemented to be at the pixel clock rate. For example, in a configuration having 32 interpolation operations for each compensation operation, the rate of the compensation clock signal 318 may be 32 times slower than the rate of the pixel clock signal 320. Similarly, in a configuration having 16 interpolation operations for each compensation operation, the rate of the compensation clock signal 318 may be 16 times slower than the rate of the pixel clock 320 signal.

The compensation circuits 102 can be implemented singularly or in pluralities of two or more. For example, a single compensation circuit can be implemented to control intensity, focus, astigmatism, convergence, linearity, distortion, or another condition associated with a display system. Alternately, a plurality of compensation circuits can be implemented each to control intensity, focus, astigmatism, convergence, linearity, distortion, or other conditions associated with a display system in combinations thereof. For convenience of discussion, the compensation circuits 102 are shown self contained having dedicated components. However, various components can be shared between a plurality of compensation circuits 102, such as to optimize circuitry. For example, the ADCs 210 and 212 and the address register 218 can be shared between two or more compensation circuits. Also, the clock signal generator 242 can be shared between two or more compensation circuits. Also, the compensation memory 222 and the output register 226 can be shared between two or more compensation circuits. For example, the compensation memory 222 can store multiple compensation parameters or multiple compensation change parameters in each address location so that multiple compensation parameters or multiple compensation change parameters are accessed for each address 215 generated by the ADCs 210 and 212. Further, in an output register configuration, multiple compensation parameters or multiple compensation change parameters that are accessed from a shared compensation memory or from multiple dedicated compensation memories can be loaded into a shared output register 226. Further, multiple compensation parameters that are accessed from a shared compensation memory or from multiple dedicated compensation memories and that are loaded into a shared output register or multiple dedicated output registers can be processed by multiple channels of DACs 230 to generate multiple channels of compensation signals 103 to control multiple compensation devices or circuits. Further, multiple compensation change parameters that are accessed from a shared compensation memory or from multiple dedicated compensation memories and that are loaded into a shared output register or multiple dedicated output registers can be processed by multiple channels of DACs 230 to generate multiple channels of compensation change signals from the output register 226 to invoke multiple channels of interpolation with multiple channels of adders 314 and accumulators 310 to control multiple channels of DACs 230 to control multiple compensation devices or circuits. Other components can also be shared to further optimize circuitry.

The system of the present invention automatically adapts to the scan rate and aspect ratio of a display monitor to which it is connected. As discussed above, this is achieved because the compensation operations are performed in response to the actual scan signals. In this configuration, the scan signals are converted from analog to digital form and are used to access a digital lookup table to generate compensation parameters. Consequently, if the same monitor is utilized but the scan signals are changed, such as to implement a different scan rate or a different aspect ratio, the operation of the compensation circuit is automatically and adaptively changed consistent therewith and the table of compensation parameters should not have to be changed.

It is to be understood that the above-described embodiments are illustrative of some of the many specific embodiments that represent applications of the principles of the present invention. Clearly, numerous and varied other arrangements may be designed by those skilled in the art without departing from the scope of the invention.

What is claimed is:

1. A display system comprising:
   a sweep circuit for generating a sweep signal;
   a compensation circuit for generating a compensation signal in response to the sweep signal generated by said sweep circuit;
   an electron gun for generating an electron beam;
   a display media responsive to said electron beam;
   a deflection arrangement for sweeping the electron beam generated by said electron gun across said display media under control of the sweep signal generated by said sweep circuit and for exciting the display media under control of the compensation signal generated by said compensation circuit; said display media displaying an image in response to the electron beam swept thereacross under control of the sweep signal generated by said sweep circuit and under control of the compensation signal generated by said compensation circuit;
said sweep circuit including a ramp generator for generating the sweep signal as a ramp sweep signal having a predetermined rate of ramp sweeps per second;
said compensation circuit including:
  (a) an analog to digital converter coupled to the output of said ramp generator for generating a digital ramp signal in response to the ramp sweep signal,
  (b) a memory address register coupled to the output of said analog to digital converter for storing a memory address in response to the digital ramp signal generated by said analog to digital converter,
  (c) a DRAM coupled to said memory address register for storing a plurality of compensation parameters and for outputting an addressed one of the plurality of compensation parameters under control of the memory address stored by said memory address register,
  (d) an output register coupled to said DRAM for storing the compensation parameter output by said DRAM,
  (e) an interpolation circuit coupled to said output register for generating a plurality of interpolated compensation parameters in response to the compensation parameter stored by said output register, and
  (f) a digital to analog converter coupled to said interpolation circuit and to said deflection arrangement for applying the compensation signal to said deflection arrangement in response to the interpolated compensation parameters generated by said interpolation circuit.

2. A display system comprising:
a sweep circuit for generating a sweep signal;
a compensation circuit for generating a compensation signal in response to the sweep signal generated by said sweep circuit;
an electron gun for generating an electron beam;
a display media responsive to said electron beam;
a deflection arrangement for sweeping the electron beam generated by said electron gun across said display media under control of the sweep signal generated by said sweep circuit and for exciting the display media under control of the compensation signal generated by said compensation circuit; said display media displaying an image in response to the electron beam swept thereacross under control of the sweep signal generated by said sweep circuit and under control of the compensation signal generated by said compensation circuit;
said sweep circuit including a ramp generator for generating the sweep signal as a ramp sweep signal having a predetermined rate of ramp sweeps per second;
said compensation circuit including:
an analog to digital converter coupled to the output of said ramp generator for generating a digital ramp signal in response to the ramp sweep signal,
a memory address register coupled to the output of said analog to digital converter for storing a memory address in response to the digital ramp signal generated by said analog to digital converter,
a compensation memory coupled to said memory address register for storing a plurality of compensation parameters and for outputting an addressed one of the plurality of compensation parameters under control of the memory address stored by said memory address register,
an output register coupled to said compensation memory for storing the compensation parameter output by said compensation memory, and
a digital to analog converter coupled to said output register and to said deflection arrangement for applying the compensation signal to said deflection arrangement in response to the interpolated compensation parameters generated by said interpolation circuit.

3. A display system comprising:
a sweep circuit for generating a sweep signal;
a compensation circuit for generating a compensation signal in response to the sweep signal generated by said sweep circuit;
an electron gun for generating an electron beam;
a display media responsive to said electron beam;
a deflection arrangement for sweeping the electron beam generated by said electron gun across said display media under control of the sweep signal generated by said sweep circuit and for exciting the display media under control of the compensation signal generated by said compensation circuit; said display media displaying an image in response to the electron beam swept thereacross under control of the sweep signal generated by said sweep circuit and under control of the compensation signal generated by said compensation circuit;
said sweep circuit including a ramp generator for generating the sweep signal as a ramp sweep signal having a predetermined rate of ramp sweeps per second;
said compensation circuit including:
  (a) an analog to digital converter coupled to the output of said ramp generator for generating a digital ramp signal in response to the ramp sweep signal,
  (b) a memory address register coupled to the output of said analog to digital converter for storing a memory address in response to the digital ramp signal generated by said analog to digital converter,
  (c) a compensation memory coupled to said memory address register for storing a plurality of compensation parameters and for outputting an addressed one of the plurality of compensation parameters under control of the memory address stored by said memory address register,
  (d) an output register coupled to said compensation memory for storing the compensation parameter output by said compensation memory,
  (e) an interpolation circuit coupled to said output register for generating a plurality of interpolated compensation parameters in response to the compensation parameter stored by said output register, and
  (f) a digital to analog converter coupled to said interpolation circuit and to said deflection arrangement for applying the compensation signal to said deflection arrangement in response to the interpolated compensation parameters generated by said interpolation circuit.

4. A display system comprising:
a sweep circuit for generating a sweep signal;

a compensation circuit for generating a compensation signal in response to the sweep signal generated by said sweep circuit;

an electron gun for generating an electron beam;

a display media responsive to said electron beam;

a deflection arrangement for sweeping the electron beam generated by said electron gun across said display media under control of the sweep signal generated by said sweep circuit and for exciting the display media under control of the compensation signal generated by said compensation circuit; said display media displaying an image in response to the electron beam swept thereacross under control of the sweep signal generated by said sweep circuit and under control of the compensation signal generated by said compensation circuit;

said sweep circuit including a ramp generator for generating the sweep signal as a ramp sweep signal having a predetermined rate of ramp sweeps per second;

said compensation circuit including:

(a) an analog to digital converter coupled to the output of said ramp generator for generating a digital ramp signal in response to the ramp sweep signal, (b) a memory address register coupled to the output of said analog to digital converter for storing a memory address in response to the digital ramp signal generated by said analog to digital converter, (c) a DRAM coupled to said memory address register for storing a plurality of compensation parameters and for outputting an addressed one of the plurality of compensation parameters under control of the memory address stored by said memory address register, and (d) an output register coupled to said DRAM for storing the compensation parameter output by said DRAM, (e) a digital to analog converter coupled to said DRAM and to said deflection arrangement for applying the compensation signal to said deflection arrangement in response to the interpolated compensation parameters generated by said interpolation circuit.

* * * * *